United States Patent [19]

Tanaka et al.

[11] Patent Number: 4,458,998
[45] Date of Patent: Jul. 10, 1984

[54] MECHANICAL SHOCK ABSORBING DEVICE OF A CAMERA

[75] Inventors: Etsuo Tanaka, Tokyo; Yoshiaki Tanabe, Kawasaki, both of Japan

[73] Assignee: Nippon Kogaku K.K., Japan

[21] Appl. No.: 434,358

[22] Filed: Oct. 14, 1982

[30] Foreign Application Priority Data

Oct. 17, 1981 [JP] Japan .................................. 56-166088
Oct. 17, 1981 [JP] Japan .................................. 56-166089

[51] Int. Cl.³ .............................................. G03B 19/12
[52] U.S. Cl. ...................................... 354/154; 354/246; 354/274
[58] Field of Search .............................. 354/152–154, 354/245–249, 270, 274, 136

[56] References Cited

U.S. PATENT DOCUMENTS 3,672,282 6/1972 Yamada ........................... 354/246 X Primary Examiner—John Gonzales
Attorney, Agent, or Firm—Shapiro and Shapiro

[57] ABSTRACT

In a camera having a moving body provided with an optical element which is movable over a predetermined distance in a predetermined direction in connection with a photographing operation, a shock absorbing device acting on a shock resulting from the movement of the moving body includes counterweight means having a greater inertial mass than the moving body, and drive means for moving the counterweight means and the moving body in synchronism with each other. The drive means moves the counterweight means in the direction opposite to the direction of movement of the moving body and over a distance shorter than the movement distance of the center of gravity of the moving body.

18 Claims, 12 Drawing Figures

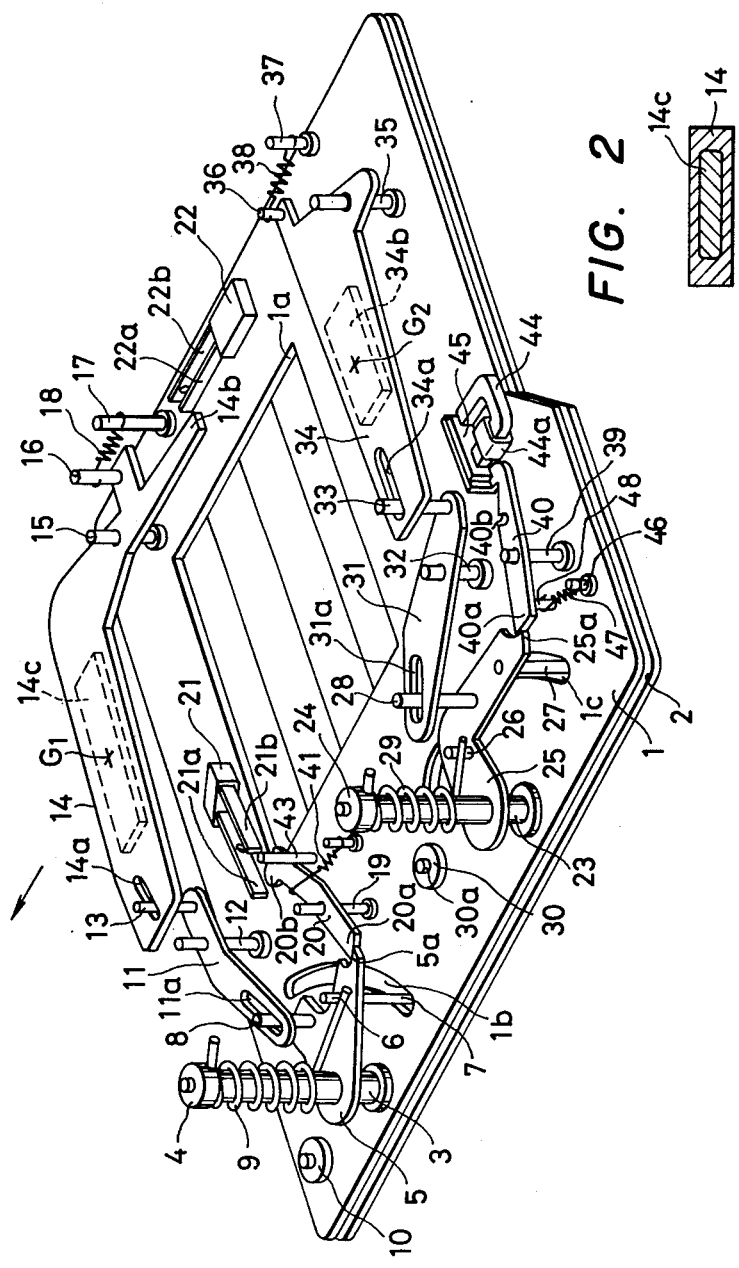
FIG. 1
FIG. 2

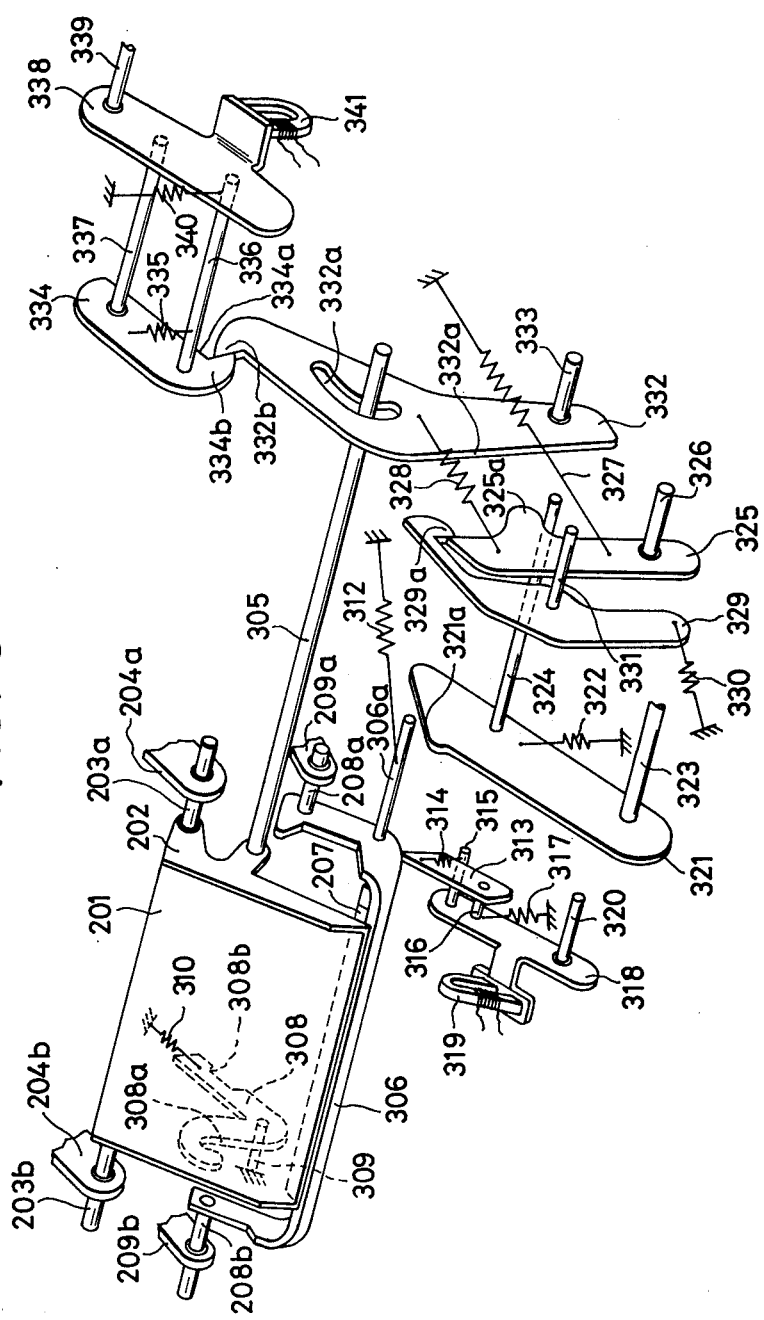

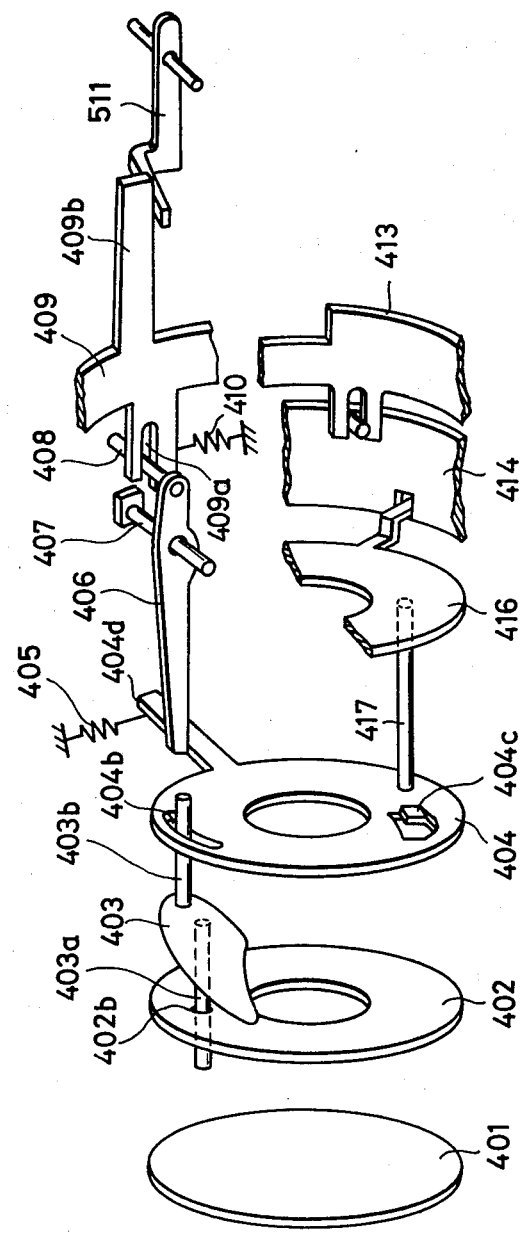

MECHANICAL SHOCK ABSORBING DEVICE OF A CAMERA

BACKGROUND OF THE INVENTION

1. Field of the Invention

This invention relates to a mechanical shock absorbing device of a camera, and more particularly to a device for softening the shock or vibration produced from a device such as a shutter device, a movable reflecting mirror device or a stop device having members moving at a relatively high speed with photographing.

2. Description of the Prior Art

Heretofore, in the device of this type, as one relating, for example, to a movable reflecting mirror retracted out of the picture-taking optical path while rotating prior to photographing, use has generally been made of a device in which a lever rotatable in the direction opposite to the direction of rotation of the reflecting mirror in response to the rotation of the reflecting mirror is provided and a counterweight is fixed to one end portion of the lever so that any vibration resulting from the rotation of the reflecting mirror is absorbed by movement of the counterweight. In such a device of the prior art, no consideration has been given to the relation among the mass of the counterweight and the movement distance thereof and the movement distance of the center of gravity of the reflecting mirror, and this has led to the following disadvantages. In the device of the prior art, the counterweight moves over a considerably long distance as compared with the movement distance of the center of gravity of the reflecting mirror. A wide space for permitting the counterweight to move is necessary in the interior of the camera and if such a device of the prior art is incorporated into a camera having many limitations in volume, the camera itself will become bulky. Also, the driving energy necessary to move the counterweight is necessarily great because the movement distance of the counterweight is long and, in the case of the prior art device, the energy of the same degree as or greater than the driving energy of the reflecting mirror has been necessary for the counterweight. Accordingly, where such a counterweight is incorporated into a camera, great driving energy becomes necessary as compared with a case where the counterweight is absent, and this has led to a serious disadvantage that the force necessary to wind up the camera necessarily becomes great because it charges this driving energy. In the recent cameras which are often used with a motor drive device mounted thereon, this presents itself as a disadvantage such as a reduced frame speed or a decreased life of the battery.

SUMMARY OF THE INVENTION

It is an object of the present invention to provide a shock absorbing device of a camera which is capable of accomplishing antivibration by a narrow space and a small driving energy against a shock or vibration produced by a main moving member moving with photographing.

The momentum of a counterweight is represented by the value of the product of the mass of the counterweight and the movement velocity of the counterweight. Therefore, to obtain the same degree of antivibration effect as that of the prior art device, a counterweight having a momentum equal to the momentum of the counterweight of the prior art device may be operated. More specifically, even when a counterweight having a greater mass than the prior art device is moved at a lower velocity than the prior art device, if the value of the product of mass and velocity is equivalent to that in the prior art device, the antivibration effect thereof will be equivalent to that of the prior art device.

On the other hand, the energy necessary to drive the above-described counterweight is proportional to the mass of the counterweight and proportional to the square of the movement velocity. Thus, if said energy is expressed by the use of the value of said momentum, "the energy is proportional to the momentum of the counterweight and further proportional to the movement velocity of the counterweight." Accordingly, when a counterweight having a momentum equivalent to that of the prior art device is moved at a lower velocity than the prior art device, it will be seen that the energy necessary to drive the counterweight may be smaller by an amount corresponding to the reduction in movement velocity. Further, in this case, the momentum of the counterweight is equivalent to that in the prior art device and it is therefore apparent that the antivibration effect by the counterweight is equivalent to that in the prior art device.

Thus, when a counterweight having a greater mass than in the prior art device is moved at a lower velocity than the prior art device, if only the momentum is equivalent, there can be obtained an antivibration device having the same degree of antivibration effect as that of the prior art and yet requiring a small driving energy. The counterweight starts moving simultaneously with a moving body provided with optical elements such as a shutter blade and a reflecting mirror and stops moving simultaneously with the moving body. Accordingly, the movement distance of the above-mentioned counterweight may be shorter by an amount corresponding to the low movement velocity.

In the present invention, design is made such that the driving energy of the counterweight is not greater than the driving energy of the moving body, that the inertial mass of the counterweight is greater than the inertial mass of the moving body, and that the movement distance of the center of gravity of the counterweight is shorter than the movement distance of the center of gravity of the moving body.

In a preferred embodiment of the present invention, the counterweight is driven by an independent drive source discrete from the drive source of the moving body in synchronism with the operation of the moving body.

Further, the counterweight driven by the independent drive source should preferably be designed to produce a signal associated with the operation timing of the moving body. Thereby, any work which would hamper the smooth operation of the moving body can be subrogated by the counterweight.

In another preferred embodiment of the present invention, the counterweight acts in synchronism with the movement of the movable reflecting mirror of a single lens relfex camera and, when the reflecting mirror is in an observation position, the counterweight lies between the edge of the reflecting mirror and the camera wall, thereby acting as a light-intercepting wall.

According to the present invention, there is provided a device of simple construction for coupling said light-intercepting wall to the reflecting mirror and moving the same.

The invention will become more fully apparent from the following detailed description thereof taken in conjunction with the accompanying drawings.

BRIEF DESCRIPTION OF THE DRAWINGS

FIG. 1 is a perspective view showing the shutter device of a camera according to a first embodiment of the present invention.

FIG. 2 is a cross-sectional view of an element forming the essential portion of FIG. 1.

FIG. 8 is a perspective view showing the movable mirror device of a camera according to a fourth embodiment of the present invention.

FIG. 9 is a perspective view showing the stop device of the picture-taking lens of a camera according to a fifth embodiment of the present invention.

DESCRIPTION OF THE PREFERRED EMBODIMENTS

Figure 3:
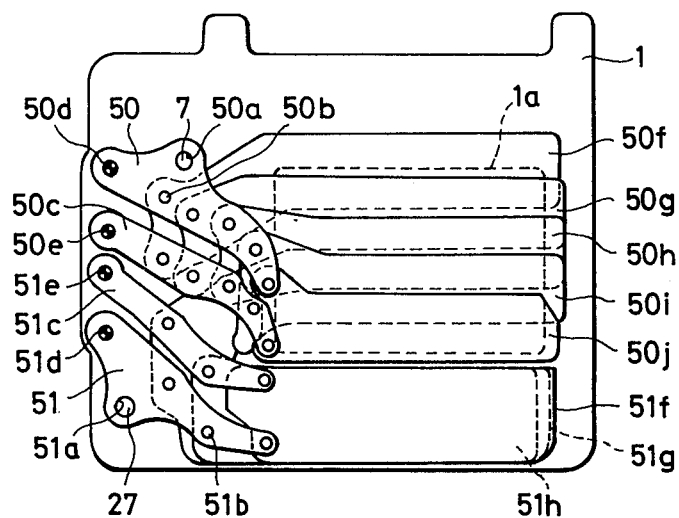
FIG. 3 is a plan view showing shutter blades used in the device of FIG. 1.

FIG. 1 shows a first embodiment in which the present invention is applied to the shutter device of a camera and illustrates a condition in which the shutter has been set and has become movable. FIG. 3 shows the shutter blades in the present embodiment. Description will first be made of an opening blades system for opening the shutter and starting exposure. Referring to FIG. 1, a shutter base plate 1 is formed with an exposure aperture 1a for effecting exposure therethrough. A cover plate 2 having a similar exposure aperture is attached to the shutter base plate 1 by a well-known method, not shown. A suitable spacing is provided between the shutter base plate 1 and the cover plate 2, and a blade chamber in which the shutter blades move is formed. A spring securing member 4 is fixed to the upper end portion of a shaft 3 studded on the shutter base plate 1. A spring securing pin 6 is studded on a shutter opening blade driving lever 5 rotatably supported around the shaft 3. A torsion spring 9 for biasing the lever 5 counter-clockwise is provided between the spring securing member 4 and the spring securing pin 6. Rotation of the lever 5 is controlled by a stopper 10 fixed to the base plate 1. The lever 5 has a pin 7 studded in the underside thereof and the lower end portion of this pin extends through an arcuate slot 1b formed in the base plate 1 and fits in the hole 50a of the opening blade arm 50 of the shutter blade shown in FIG. 3 so as to transmit counter-clockwise rotation of the lever 5 to the arm 50 and open the exposure aperture 1a. A cam slot 11a in which a pin 8 on the lever 5 is inserted is formed in one end of a connecting lever 11 pivotably supported about a shaft 12 on the base plate 1. A slot cam 14a engaged with a pin 13 on the lever 11 is formed in one end of a counterweight 14 rotatable about a shaft 15 studded on the base plate 1. A spring 18 extends between and is secured to a pin 16 studded on the counterweight 14 and a pin 17 studded on the base plate 1, and biases the counterweight 14 clockwisely with a weak force. This biasing force is for absorbing a gap produced between the pin 8 and the cam slot 11a and between the pin 13 and the cam slot 14a and stably operating the shutter. The shape of the counterweight 14 is determined such that the center of gravity thereof assumes a position G1 indicated in FIG. 1 so that it moves above the exposure aperture 1a and substantially on the same line as the center of gravity of the shutter opening blade. The mass of the counterweight is selected such that it is greater than the value of converted mass in which the masses of the opening blade and the driving lever 5 thereof have been converted on the slit forming blade 50j of the shutter. Further, the shape of the lever 11, the arrangement of the shaft 12 and the shape and arrangement of the pin 8, the cam slot 11a, the pin 13 and the cam slot 14a are determined such that the movement distance of the center of gravity G1 of the weight 14 is shorter than the distance over which the lever 5 rotates and the opening blade moves. With such a construction, when the lever 5 rotates counter-clockwisely and the opening blade moves in the direction of arrow indicated in FIG. 1, the weight 14 rotates counter-clockwisely about the shaft 15 and the center of gravity G1 thereof moves in the direction opposite to the direction of arrow over a distance shorter than the movement distance of the opening blade. Designated by 22 is the synchronizing switch of a flashlight unit which is provided with a movable contact piece 22a and a fixed contact piece 22b. The switch 22 is normally open. The movable contact piece 22a may bear against an arm 14b near the end of rotation of the lever 5 and may be displaced into contact with the fixed contact piece 22b to close the synchro switch and thereby render the flashlight unit operative.

A restraining lever 20 pivotally supported about a shaft 19 studded on the base plate 1 is engageable with the engaging portion 5a of the lever 5 during the shutter setting and thereby restrains the counter-clockwise rotation of the lever 5 by the spring 9. On the other hand, the lever 20 is provided with a protrusion 20b capable of bearing against the movable contact piece 21a of a switch 21 for starting to count the exposure time in photography, and is biased clockwisely by a tension spring 41. Clockwise rotation of the lever 20 is prevented by a pin 43 on the base plate. A switch 21 is a normally closed switch adapted to be opened by counter-clockwise rotation of the lever 20. When the switch 21 is opened, the other end of the lever 20 releases the restraint of the lever 5 to permit the lever 5 to start rotating counter-clockwisely.

What has been described above is the structure of the driving system of the opening blades for opening the exposure aperture 1a and initiating exposure and of the counterweight for the opening blades.

Description will now be made of a closing blades system for closing the exposure aperture 1a and terminating the exposure.

A spring securing member 24 is fixed to the upper end portion of a shaft 23 studded on the base plate 1. A shutter closing blade driving lever 25 pivotably supported about the shaft 23 has a spring securing pin 26 studded thereon. A torsion spring 29 for biasing the lever 25 counter-clockwise is provided between the spring securing member 24 and the spring securing pin 26. Rotation of the lever 25 is controlled by a stopper 30. A pin 27 is studded in the underside of the lever 25 and the lower end portion thereof extends through an arcuate slot 1C formed in the base plate 1 and fits in the hole 51a of the closing blade arm 51 of the shutter blade shown in FIG. 3 so as to transmit counter-clockwise rotation of the lever 25 to a member 51 and close the exposure aperture 1a. A cam slot 31a engaged with a pin 28 on the lever 25 is formed in one end of a connecting lever 31 pivotally supported about a shaft 32 on the base plate. A cam slot 34a. In which a pin 33 on the lever 31 is inserted is formed in one end of a counterweight 34 pivotable about a shaft 35 studded on the base plate 1. A spring 38 extends between and is secured to a pin 36 studded on the weight 34 and a pin 37 studded on the base plate 1, and biases the weight 34 clockwise with a weak force, thus performing a function similar to that of the aforementioned spring 18. The shape of the counterweight 34 is determined such that the center of gravity thereof assumes a position G2 indicated in FIG. 1 so that it moves below the exposure aperture 1a and substantially on the same line as the center of gravity of the shutter closing blade. The mass of the counterweight 34 is selected such that it is greater than the value of converted mass in which the masses of the closing blade and the driving lever 25 thereof have been converted on the slit forming blade 51f of the shutter. Further, the shape of the lever 31, the arrangement of the shaft 32 and the shape and arrangement of the pin 28, the cam groove 31a, the pin 33 and the cam slot 34a are determined such that the movement distance of the center of gravity G2 of the weight 34 is shorter than the distance over which the lever 25 rotates and the closing blade moves. With such a construction, when the lever 25 rotates counter-clockwise and the closing blade moves in the direction of arrow indicated in FIG. 1, the weight 34 rotates counter-clockwise about the shaft 25 and the center of gravity G2 thereof moves in the direction opposite to the direction of arrow over a distance shorter than the movement distance of the closing blade. A restraining lever 40 pivotally supported about a shaft 39 studded on the base plate 1 is engageable with the engaging portion 25a of the lever 25 during the shutter setting to restrain the counter-clockwise rotation of the lever 25 by the spring 29. The adsorbing piece 45 of an electromagnet 44 is mounted on the other end of the lever 40, and a cut-away portion 40b for imparting a resilient deformation is formed near the portion at which the adsorbing piece 45 is mounted. Further, the lever 40 is biased counter-clockwise by a tension spring 47.

The electromagnet 44 is fixed to the base plate 1 and, when power is supplied to the winding 44a thereof, the electromagnet attracts the adsorbing piece 45 and blocks the counter-clockwise rotation of the lever 40 by the tension spring 47 and, when the supply of power is cut off, the electromagnet releases the restraint of the lever 25 by the lever 40.

What has been described above is the construction of the driving device of the closing blade for closing the exposure aperture 1a and terminating the exposure.

The shutter blades shown in FIG. 3 are designed such that by an arm 50 being rotated counter-clockwisely about a shaft 50d, opening blade groups 50f-50j are folded upwardly as viewed in the figure and open the exposure aperture 1a and that when an arm 51 is rotated counter-clockwisely about a shaft 51d, closing blade groups 51f-51h are developed and close the exposure aperture 1a. The opening blade groups for opening the exposure aperture 1a and the closing blade groups for closing the exposure aperture 1a are connected to and driven by the driving levers 5 and 25, respectively.

In the present embodiment, it is desirable that the counterweights 14 and 34 have a mass at least five times as great as the value of converted mass in which the masses of the shutter blade and the driving lever thereof have been converted on the slit forming blade. In this case, if the movement distance of the center of gravity of the counterweight is 1/5 of that of the shutter slit forming blade, a perfect antivibration effect will be obtained. The external side including the bearing portions and slot cam portions of the counterweights is formed of plastic and, in the interior thereof, heavy materials 14c and 34b having a great specific gravity such as lead are embedded near the centers of gravity. FIG. 2 shows a cross section of the counterweight 14.

Figure 4A:
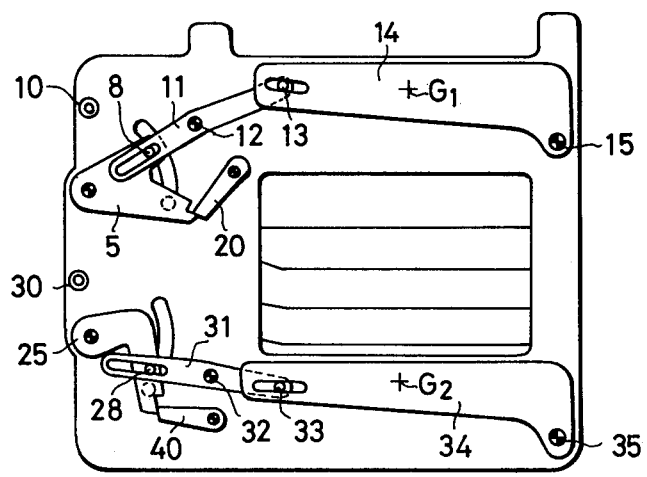
FIG. 4A is a plan view for showing the condition at the moment of an operation of the FIG. 1 device and showing a condition in which the shutter has been set.
Figure 4B:
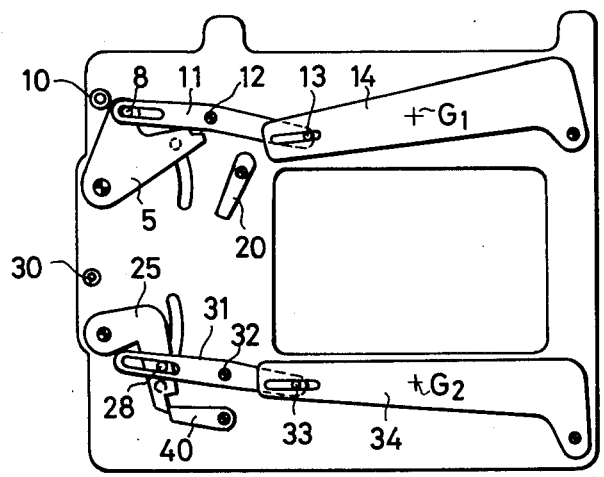
FIG. 4B is a view similar to FIG. 4A but showing a condition in which the exposure aperture has been fully opened.
Figure 4C:
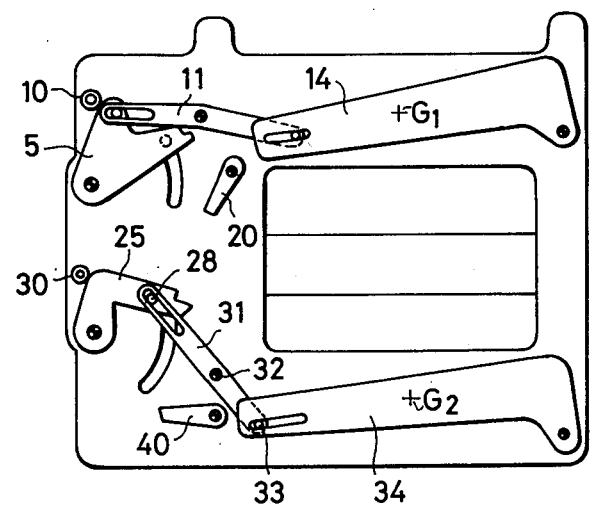
FIG. 4C is a view similar to FIG. 4A but showing a condition in which exposure has been completed.

The operation of the present embodiment will now be described by reference to FIGS. 1 and 4A-4C. In FIGS. 4A-4C, the switches and electromagnet are omitted to simplify the illustration. FIGS. 1 and 4A show a condition in which the shutter has been set. In this condition, the winding 44a of the electromagnet 44 remains supplied with power and is attracting and holding the absorbing piece 45.

When the shutter button of the camera is depressed, the restraining lever 20 is rotated counter-clockwisely about the shaft 19 against the biasing force of the spring 41 by a conventional member, not shown. At this time, one end 20a of the lever 20 releases the restraint of the end 5a of the lever 5 to permit the lever 5 to rotate counter-clockwisely while, at the same time, the other end 20b of the lever 20 opens the switch 21 to initiate the time counting of a conventional shutter time counting circuit, not shown. On the other hand, the lever 5 liberated from the restraint by the lever 20 starts to be rotated counter-clockwisely by the biasing force of the torsion spring 9. By this counter-clockwise rotation, the shutter opening blades shown in FIG. 3 which are connected to the lever 5 by the pin 7 are shifted upwardly, whereby the exposure aperture 1a is opened to initiate the exposure. At this time, the pin 8 on the lever 5 rotates the lever 11 clockwisely about the shaft 12 and further, by the pin 13 on the lever 11, the counterweight 14 is rotated counter-clockwisely about the shaft 15. The direction of movement of the center of gravity G1 of the weight 14 is opposite to the direction of movement of the shutter opening blades and negates the vibration in the direction of movement of the blades resulting from the movement of the opening blades. Moreover, according to the construction of the present embodiment, the movement velocity of the center of gravity G1 of the weight 14 is lower than the movement velocity of the opening blades but the mass of the weight is greater and therefore, it is possible to negate the vibration. When the lever 5 further rotates counter-clockwisely and the opening blades come to a position for fully opening and exposure aperture 1a, the end portion 14b of the weight 14 operatively associated with the lever 5 closes the synchro switch 22, thus rendering operative the conventional flashlight unit, not shown.

Immediately thereafter, the lever 5 bears against the stopper 10 as shown in FIG. 4B, whereby it is stopped and the opening blades are also stopped. Simultaneously therewith, the movement of the weight 14 operatively associated with the lever 5 is also stopped. At this time, a shock results from the stoppage of the lever 5 and the opening blades, but a shock in the opposite direction is also produced by the stoppage of the counterweight and these two shocks negate each other to reduce the shock propagated to the camera body, thus providing an antivibration effect.

After a predetermined time has elapsed after the switch 21 has been opened and the shutter time counting circuit, not shown, has started the time counting, the supply of power to the winding 44a of the electromagnet 44 is cut off and the electromagnet 44 releases the adsorbing piece 45. Simultaneously therewith, the restraining lever 40 is rotated counter-clockwisely about the shaft 39 by the force of the spring 47. At this time, one end 40a of the lever 40 releases the restraint of the end portion 25a of the lever 25. On the other hand, the lever 25 released from the restraint by the lever 40 starts to be rotated counter-clockwisely by the biasing force of the torsion spring 29. By this counter-clockwise rotation, the shutter closing blades shown in FIG. 3 which are connected to the lever 25 by the pin 27 is shifted upwardly to close the exposure aperture 1a, thus terminating the exposure. At this time, the pin 28 on the lever 25 rotates the lever 31 clockwisely and further, by the pin 33 on the lever 31, the counterweight 34 is rotated counter-clockwisely. The direction of movement of the weight 34 is opposite to the direction of movement of the closing blades and thus, the movement of the weight negates the vibration of the camera resulting from the movement of the closing blades. The lever 25 further rotates counter-clockwisely to bear against the stopper 30, whereby the lever 25 and the rearward shutter curtain are stopped and at the same time, the weight 34 is also stopped. As has been previously described with respect to the opening blades, the shocks produced when the lever 25 and the weight 34 are stopped negate each other to prevent any vibration of the camera.

FIG. 4C shows a condition in which the movement of the closing blades has been terminated and a cycle of exposure of the camera has been completed.

A cycle of exposure is completed in the manner described above.

To return this shutter device to the set condition shown in FIG. 1, the levers 5 and 25 are rotated clockwisely by means of a wind-up device, not shown, and the engaging portions 5a and 25a of the levers 5 and 25 are brought into engagement with the end portions 20a and 40a of the levers 20 and 40. With this, the counterweights 14 and 34 are also rotated clockwisely and return to their initial positions. Before the engagement between the end portion 40a and the engaging portion 25a, the adsorbing piece 45 attached to the end portion of the lever 40 is held in its attracted position with respect to the electromagnet 44 by a holding means, not shown. Thus, the engaging portion 25a bears against the end portion 40a to resiliently deform the neighborhood of the cut-away portion 40b of the lever 40, whereby it rides over the end portion 40a and then comes into engagement therewith. This holding means releases its holding upon supply of power to the winding 44a.

The present embodiment is designed such that in the above-described one cycle of exposure operation, the movement distance of the counterweights is shorter than the movement distance of the shutter blade and that the mass of the counterweights is greater than the mass of the shutter blade.

The counterweights in the present embodiment may of course be formed of a metal such as brass.

If, in the present embodiment, the mass of the counterweights and the movement distance thereof are suitably designed, it will be possible to obtain an antivibration device which can substantially completely negate any shock and vibration resulting from the movement and stoppage of the shutter blade. Also, in a shutter having such an antivibration device, the movement of the center of gravity of the entire shutter device before and after the shutter operation can hardly occur.

As described above, the present embodiment is of such a design that the movement of the shutter driving lever is transmitted to the counterweights through an interlocking member to drive the counterweights. This eliminates the necessity of separately providing a drive source, a stop device and a charging device for the counterweights, and thus makes the construction simpler. Further, the starting and stoppage of the counterweights are completely synchronous with the starting and stoppage of the shutter blade and therefore, antivibration can be accomplished reliably.

Also, since the movement distance of the counterweights is shorter than the movement distance of the shutter blade, the counterweights can be rationally disposed in the limited space within the camera.

Figure 5:
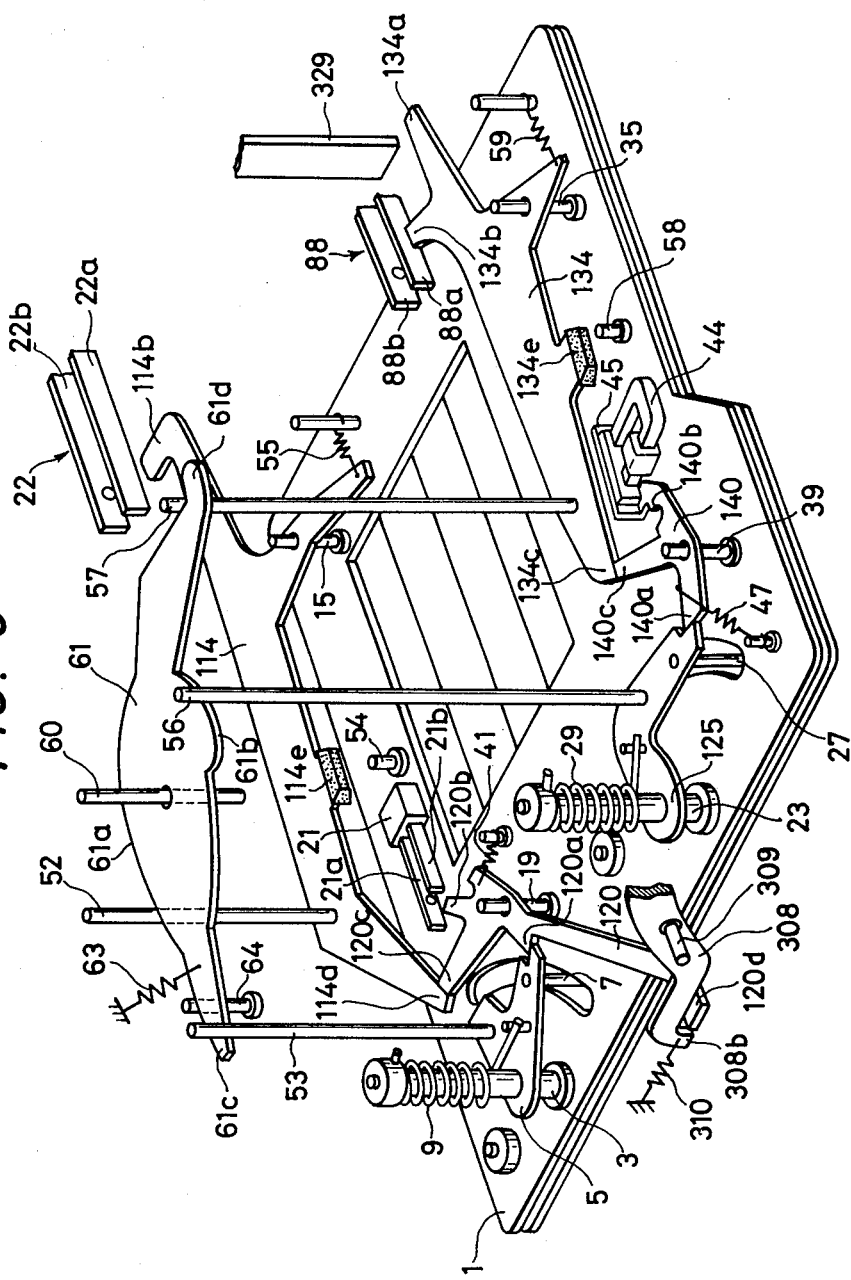
FIG. 5 is a perspective view showing the shutter device of a camera according to a second embodiment of the present invention.

FIG. 5 shows an embodiment in which, as in the first embodiment, the present invention is applied to the shutter of a camera. The embodiment of FIG. 5 is designed such that the drive source of the counterweights is independent of the drive source of the shutter blade and accordingly the counterweights in motion do not affect the movement of the shutter blade.

In the present embodiment, elements similar in function to those of the first embodiment are given similar reference numerals and need not be described.

A charge member 61 is fixed to a shaft 60, has cam surfaces 61a, 61b and arms 61c, 61d and is biased clockwisely by a spring 63. One end of the spring 63 is secured to the charge member 61 and the other end is secured to the camera body. A rod 52 is fixed on a counterweight 114 biased counter-clockwisely by a spring 55 and is capable of bearing against the cam surface 61a of the charge member 61. A rod 53 is fixed on a drive lever 5 and is capable of bearing against the arm 61c of the charge member 61. A restraining lever 120 has, in addition to a portion 120a for restraining the drive lever 5, an arm 120c for restraining the counterweight 114 and another arm 120d. A rod 56 is fixed on a drive lever 125 and is capable of bearing against the cam surface 61b of the charge member 61. A rod 57 is fixed on a counterweight 134 biased counter-clockwisely by a spring 59 and is capable of bearing against the arm 61d of the charge member 61. A restraining lever 140 has a protrusion 140a for restraining the lever 125 and a protrusion 140c for restraining the weight 134, and is biased counter-clockwisely.

The operation of the present embodiment is as follows. Upon shutter release, an unshown member operatively associated with the retraction of a return mirror out of the picture-taking optical path rotates a lever 308 counter-clockwise against the force of a spring 310. Thereupon, the hook portion 308b of the lever 308 pushes the arm portion 120d of the lever 120, whereby the lever 120 is rotated counter-clockwisely against the force of a spring 41 and releases the restraint of the lever 5 and the weight 114 at a time. The lever 5 is rotated counter-clockwisely by the action of a spring 9, and a pin 7 moves the opening blades, thereby opening the exposure aperture. On the other hand, the counterweight 114 is rotated counter-clockwisely by the action of a spring 55. After the opening blades have fully opened the aperture, the protrusion 114b of the weight 114 pushes the movable contact piece 22a of the synchro switch 22 of the flashlight unit, thereby closing the switch 22. The weight 114 rotates until a shock absorbing member 114e secured thereto bears against a fixed pin 54. The protrusion 120b of the restraining lever 120 opens a switch 21 at the moment when it releases the restraint of the lever 5. After a predetermined exposure time has elapsed, a magnet 44 loses its attraction and the restraining lever 140 rotates counter-clockwisely to release the restraint of the drive lever 125 and the counterweight 134. Then, the lever 125 rotates counter-clockwisely and a pin 27 moves the closing blades to close the aperture.

On the other hand, the weight 134 is rotated counter-clockwisely by the action of a spring 59. After the closing blades have closed the aperture, one end 134a pushes the end portion of a member 329 for expediting the return of the return mirror into the picture-taking optical path, thereby returning an unshown mirror to an observation position. Subsequently, a protrusion 134b pushes the movable contact piece 88a of a switch 88 into contact with the fixed contact piece 88b thereof, whereby a signal representative of the completion of exposure is produced and a motor, not shown, is driven, whereupon the film and shutter wind-up operation is entered. The weight 134 strikes against a pin 58 to which a shock absorbing member 134e is fixed, and stops moving. The shutter charge operation rotates the charge member 61 counter-clockwisely with the shaft 60 after, at the initial stage of the charge, an unshown lever has rotated the restraining lever 140 clockwisely and has caused it to be restrained by the magnet 44. At this time, a cam surface 61a pushes the rod 52. Therefore, the weight 114 rotates clockwisely and the protrusion 114d rides over the protrusion 120c of the restaining lever 120 which has returned to its initial position with the return of the mirror to the observation position, and is restrained thereby. The rod 53 which is in contact with an arm 61c is also pushed by the counter-clockwise rotation of the charge member 61 and therefore, the lever 5 is rotated clockwisely and restrained by the protrusion 120a of the restraining lever 120. The rod 56 which is in contact with a cam surface 61b returns the lever 125 to its initial position, and the rod 57 which is in contact with an arm 61d returns the counterweight 134 to its initial position. After the above-described operation has been terminated, the shaft 60 is released from the restraint by a device, not shown. The shaft is rotated clockwisely with the charge member 61 by the action of a spring 63 and the arm strikes against a pin 64 fixed to the camera body, whereupon the movement of the shaft is stopped.

As described above, the second embodiment has a drive source for driving the counterweights which is entirely independent of the shutter blade, and the counterweights in motion affect the movement of the shutter blade in no way. Accordingly, there is an advantage that even when the movement of the counterweights is hampered by some reason or other during the exposure operation of the shutter, the shutter blade can maintain its stable movement. Also, a signal for returning the return mirror into the picture-taking optical path after completion of the exposure is put out from the counterweights and therefore, the energy taken from the closing blades by the signal output can be subrogated by the counterweights, thus preventing unsatisfactory movement of the closing blades.

In the above-described first and second embodiments, the pivot shafts of the counterweights are disposed on the opposite side to the pivot shaft of the shutter blade driving lever with respect to the exposure aperture, but alternatively, they may be disposed on the same side relative to the exposure aperture.

Figure 6:
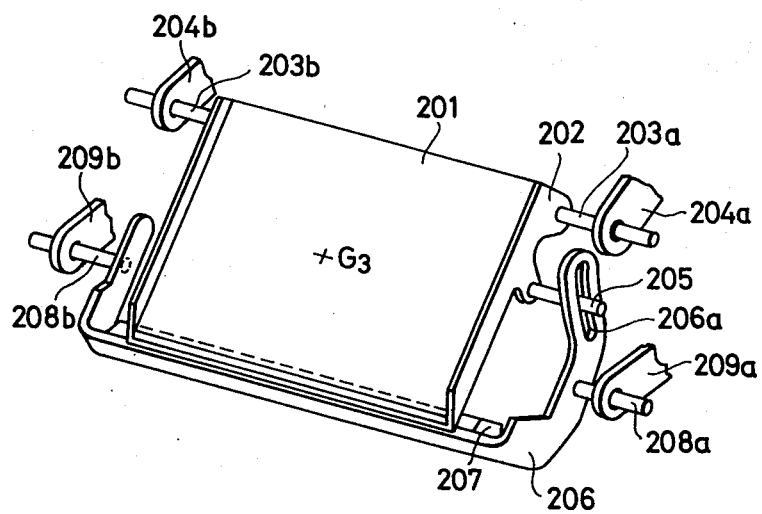
FIG. 6 is a perspective view showing the movable mirror device of a camera according to a third embodiment of the present invention.

FIGS. 6-8 show some embodiments in which the present invention is applied to the antivibration device of the movable reflecting mirror of a single lens reflex camera.

Referring to FIG. 6, the movable reflecting mirror 201 of a single lens reflex camera is mounted on a support frame 202 by a conventional method. The composite center of gravity of the reflecting mirror 201 and the support frame 202 is at a position G3. Pins 203a and 203b are studded laterally of the support frame 202 and are fitted in the holes of bearings 204a and 204b provided on the camera body. With the above-described construction, the reflecting mirror 201 is held for rotation about a rotational axis passing through the pins 203a and 203b, and is reciprocally pivotable by a conventional driving device, not shown, between a lowered position in which an object image can be observed through a viewfinder and an elevated position in which the mirror is retracted out of the picture-taking optical path. Further, an interlocking pin 205 is studded laterally of the support frame 202.

A counterweight 207 is fixed to a support frame 206. The arm portion of the support frame 206 is formed with a cam slot 206a in which the pin 205 is inserted. Pins 208a and 208b are studded on the opposite side surfaces of the frame 206 and fitted in the holes of bearing portions 209a and 209b provided on the camera body, and support the support frame 206 pivotally about an axis passing through the pins 208a and 208b. With the above-described construction, when the reflecting mirror 201 rotates from its shown position clockwisely about an axis passing through the pins 203a and 203b, the support frame 206 and the counterweight 207 are guided by the pin 205 and rotate counter-clockwisely about the axis passing through the pins 208a and 208b. Conversely, when the reflecting mirror 201 rotates counter-clockwisely and returns to its shown position, the support frame 206 and the counterweight 207 rotate clockwisely. Thus, the center of gravity G3 of the reflecting mirror 201 and the counterweight 207 move always in opposite directions.

The mass of the counterweight 207 has a value greater than the sum of the masses of the reflecting mirror 201 and its support frame 202. Further, the arrangement and shapes of the cam slot 206a formed in the support frame 206 and the pins 208a and 208b are selected such that the movement distance of the arcuately moving counterweight 207 on the arc is shorter than the movement distance on the arc depicted by the composite center of gravity G3 of the reflecting mirror 201 and the support frame 202. Accordingly, the counterweight 207 having a greater mass than the reflecting mirror 201 and the support frame 202 moves over a shorter distance than the center of gravity G3 in the direction opposite to the reflecting mirror.

Figure 7A:
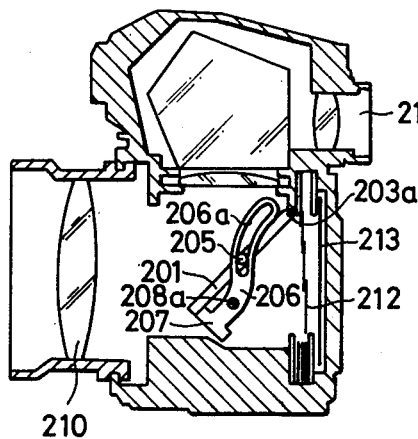
FIG. 7A is a cross-sectional view of a single lens reflex camera having the device of FIG. 6 and showing a condition in which the mirror is in an observation position.
Figure 7B:
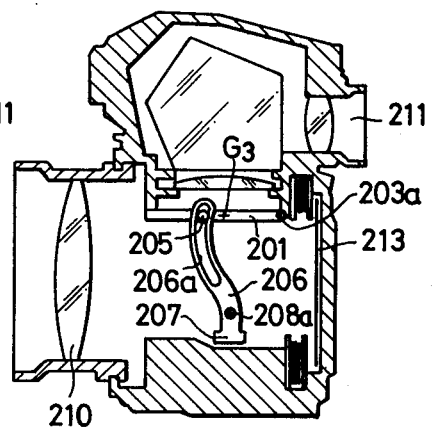
FIG. 7B is a view similar to FIG. 7A but showing a condition in which the mirror is in a photographing position.

FIGS. 7A and 7B show the device of FIG. 6 as incorporated into an actual single lens reflux camera. The reflecting mirror 201 is disposed across the optical path leading from a picture-taking lens 210 to a shutter 212 or a film surface 213.

The counterweight 207 is mounted on the support frame 206 and, again in the present embodiment, as in the aforedescribed first embodiment, the support frame may be formed of synthetic resin and a counterweight made of a metal having a great specific gravity such as lead may be embedded in the interior of the support frame.

In FIG. 7A which shows a condition in which the reflecting mirror has assumed a so-called lowered position in which the object image can be observed from a viewfinder 211, when the release button of a camera, not shown, is depressed, a reflecting mirror driving device, not shown, is operated and the reflecting mirror 201 and support frame 202 start to rotate clockwise about the pin 203a. With this, the counterweight 207 starts to rotate counter-clockwise about the pin 208a. At this time, the movement velocity of the counterweight 207 is lower than the movement velocity of the center of gravity G3 of the reflecting mirror 201 and support frame 202, but the mass of the counterweight 207 is greater than the total mass of the reflecting mirror 201 and support frame 202 and therefore, the movement of the counterweight negates the vibration resulting from the movement of the reflecting mirror, thus preventing vibration of the camera body.

When the rotation of the reflecting mirror 201 further progresses and the reflecting mirror shifts to its elevated position as shown in FIG. 7B wherein it has been retracted out of the picture-taking optical path and the movement thereof has stopped, the counterweight 207 also stops moving. At this time, a shock force is produced by the stoppage of the reflecting mirror and its support frame, but the counterweight 207 having a great mass and moving at a low velocity also stops at the same time, whereby a shock force in the opposite direction to said shock force is produced. These two shock forces negate each other and reduce the shock force propagated to the camera body, thereby preventing vibration of the camera.

Thereafter, the exposure of the film surface 213 by the shutter 212 is terminated and the reflecting mirror 201 returns from its elevated position to its lowered position and again in this case, the shock and vibration by movement of the reflecting mirror and support frame are negated by movement of the counterweight, thereby preventing vibration of the camera.

In the present embodiment, the movement distance of the counterweight may be shorter than the movement distance of the center of gravity G3 and therefore, the arrangement of the counterweight onto the back side of the reflecting mirror becomes possible and the space within the camera can be utilized effectively. Further, in the cameras of the prior art, there has often occurred a light leakage accident that the stray light having passed through the picture-taking lens and through the gap in the lower end portion of the reflecting mirror and having reached the shutter surface enters the film surface from the gap in the light-intercepting member of the shutter and sensitizes the film. If, as in the present embodiment, the counterweight is disposed on the back side of the reflecting mirror, the counterweight can be utilized as the light-intercepting member for intercepting the stray light as mentioned above, thereby preventing the light leakage accident as described above.

FIG. 8 shows another embodiment of the antivibration device of the reflecting mirror. In this embodiment, the reflecting mirror and the counterweight are provided with respective drive sources and design is made such that the counterweight in motion does not affect the rotation of the reflecting mirror. FIG. 8 shows a condition in which the charge of the mirror has been completed. A shaft 323 is rotated counter-clockwise by charging operation. A charge member 321 is fixed to the shaft 323 and biased clockwise by a spring 322. A rod 324 fixed to the charge member 321 is in contact with a driving lever 325 for returning the mirror to an observation position. This driving lever 325 is rotatably supported on a shaft 326, is biased clockwise by two springs 327 and 328 and is restrained by a restraining lever 329. The spring 327 is provided between the lever 325 and the camera body, and the spring 328 is provided between the lever 325 and a mirror driving lever 332. The restraining lever 329 is rotatably supported on a shaft 331 and biased clockwise by a spring 330. The driving lever 332 is rotatably supported on a shaft 333 and biased counter-clockwise by the spring 328. A lever 334 is rotatably supported on a shaft 337 on a lever 338 and restrains the lever 332. A rod 336 fixed to the magnet lever 338 is in contact with the lower portion 334a of the restraining lever 334. A spring 335 extends between and is secured to the lever 334 and the rod 336. The magnet lever 338 is rotatably supported on a shaft 339 and biased clockwise by a spring 340. A magnet 341 attracts and holds the magnet lever 338. A pin 305 studded on the support frame 202 of the reflecting mirror fits in the cam slot 332a of the mirror driving lever 332. A support frame 306 having a counterweight 207 is biased counter-clockwise by a spring 312. A transmitting lever 308 having a contact surface 308a in the locus of pivotal movement of the support frame 306 is rotatably supported on a shaft 309 and biased counter-clockwise by a spring 310. The movement of the support frame 306 is restrained by a restraining lever 313 rotatably supported on a shaft 316 on the magnet lever 308. The restraining lever 313 is biased clockwise by a spring 314 and urged against a shaft 315 on a magnet lever 318. The magnet lever 318 is rotatably supported on a shaft 320, is biased clockwise by a spring 317 and is attracted and held by a magnet 319.

The operation of the present device will now be described. Upon shutter release operation, power is supplied to the magnets 341 and 319 from an electric circuit, not shown. By this, the magnets 341 and 319 lose their attracting forces at a time. The magnet lever 338 liberated from the magnet 341 rotates clockwise. At this time, the restraining lever 334 also rotates through the shafts 336 and 337 and releases the restraint of the pawl portion 332b of the driving lever 332. The lever 332 thus released from the restraint is rotated counter-clockwise by the action of the spring 328 and pivots the reflecting mirror out of the picture-taking optical path through the pin 305. On the other hand, the magnet lever 318 rotates clockwise with the restraining lever 313 and releases the restraint of the support frame 306. The frame 306 thus released from the restraint is rotated counter-clockwise by the action of the spring 312. Near the end of this rotation, the side surface 308a of the lever 308 is pushed against the force of the spring 310 and the restraint of the restraining lever 120 which is restraining the opening blades of the shutter shown in FIG. 5 is released. By this, the aperture is opened, whereafter the previously described shutter operation is effected. By the signal representative of the return of the mirror to the observation position which is produced by the counterweight 134 of FIG. 5, the restraining lever 329 is rotated counter-clockwisely against the force of the spring 330. Thereupon, the pawl portion 329a of the lever 329 releases the restraint of the driving lever 325. The lever 325 is rotated clockwisely by the action of the spring 327 and pushes the side surface 332a of the driving lever 332 by the protrusion 325a thereof, thereby rotating the lever 332 clockwisely. Thereupon, the pin 305 fitted in the cam slot 332a is rotated in the direction opposite to that during the retraction of the mirror out of the picture-taking optical path and thus, the mirror returns to the observation position. The charging operation of the present device rotates the magnet levers 318 and 338 against the forces of the springs 317 and 340 at the first stage of charge in an unshown manner and these magnet levers are attracted and held by the magnets 319 and 341. At this time, the pawl 334b of the restraining lever 334 is at a position in which it restrains the rotation of the pawl 332b of the lever 332. At the second stage of charge, the shaft 323 is rotated counter-clockwisely by unshown means with the charge member 321. At this time, the cam surface 321a of the charge member 321 pushes a pin 306a and rotates the support frame 306 clockwisely and into engagement with the restraining lever 313. On the other hand, the rod 324 provided on the charge member 321 rotates the driving lever 325 counter-clockwisely, whereafter it is restrained by the lever 329. At the same time, the springs 327 and 328 are charged and thus, the charging operation is completed.

FIG. 9 shows an embodiment in which the device of the present invention is applied to the stop mechanism of the interchangeable type picture-taking lens barrel of a camera.

The mechanism shown in FIG. 9 is contained in a lens barrel, not shown, and is mounted on a camera body, not shown.

Several stop blades 403 are disposed around the optical axis of a picture-taking lens 401, and each of the stop blades 403 has a pin 403a fitted in a bearing hole 402b in a support ring 402, and a pin 403b inserted in a slot cam 404b provided in a drive ring 404 rotatably supported about the optical axis. The number of the bearing holes 402b and the number of the slot cams 404b correspond to the number of the stop blades.

A projection 404c and an arm 404d are provided on the drive ring 404, and one end of a tension spring 405 is secured to the arm 404d. When the drive ring 404 is rotated counter-clockwisely about the optical axis by the spring 405, the stop blades 403 are stopped down.

Rotation of the drive ring 404 is blocked by a lever 406 pivotably supported about a pin 407 studded in the inner surface of the lens barrel. A counterweight 409 is pivotably supported about the optical axis and has a fork 409a engaged with a pin 408 studded in a transmitting lever 406, and an arm 409b bearing against a stop lever 511 on the camera body, not shown. The counterweight 409 is biased clockwisely about the optical axis by a spring 410.

The moment of inertia the counterweight 409 has about the optical axis is determined so as to be greater than the sum of the value of the moment of inertia of the stop blades 403 converted into the moment of inertia about the optical axis and the moment of inertia of the drive ring 404 about the optical axis. Also, the shape of the transmitting lever 406 and the arrangement of pins 408 and 407 are so determined that when the drive ring 404 is rotated about the optical axis, the counterweight 409 is rotated through a small angle in the direction opposite to the direction of rotation of the ring 404.

The stop lever 511 of the camera body, when in its shown position, pushes up the arm 409b of the counterweight 409 and at this time, the stop blades maintain the open stop position.

A setting ring 413 may be rotated about the optical axis by the operation of the photographer to set the aperture value. The amount of rotation of the setting ring 413 is transmitted to a stopper ring 416 through a transmitting ring 414. A pin 417 is studded in one side of the stopper ring 416 and bears against the projection 404c on the drive ring 404, whereby counter-clockwise rotation of the drive ring 404 is stopped. By rotating the setting ring 413 and holding it in a predetermined position, the spacing between the pin 417 of the stopper ring 416 and the projection 404c is determined, whereby the angle of rotation of the drive ring 404 until its rotation is stopped is determined with a result that the aperture value made by the stop blades is set.

As the shutter button of the camera body is depressed after the aperture value has been set by rotating the setting ring 413, the stop lever 511 on the camera body rotates counter-clockwisely. The counterweight 409 is rotated about the optical axis by being pulled by a spring 410 and the lever 406 is rotated clockwisely about a shaft 407. The drive ring 404 is rotated counter-clockwisely by being pulled by the spring 405 with the arm 404d bearing against the lever 406. With this rotation of the ring 404, the stop blades 403 rotate about the pin 403a to reduce the stop aperture. The rotation of the drive ring 404 is stopped by the pin 417 bearing against the projection 404c. The shock and vibration produced by a series of movements of the stop blades 403 and ring 404 are negated by the counterweight 409 which has a greater moment of inertia than these members being rotated through a smaller angle than the drive ring 404 in the direction opposite to the direction of rotation of the drive ring 404 and stop blades 403.

Also, even when the stop blades effect a movement opposite to the above-described movement and opens the stop aperture up to its fully open condition, antivibration is effected in a manner similar to that described above.

Where, as in the present embodiment, each moving member effects substantially only rotational movement, the mass and the movement distance of course correspond to the moment of inertia and the angle of rotation, respectively.

We claim:

1. In a camera having a moving body provided with an optical element which is movable over a predetermined distance in a predetermined direction in connection with a photographing operation, a shock absorbing device acting on a shock resulting from the movement of said moving body, said device comprising:

(a) counterweight means having a greater inertial mass than said moving body; and (b) drive means for moving said counterweight means and said moving body in synchronism with each other, said drive means moving said counterweight means in the direction opposite to the direction of movement of said moving body and over a distance shorter than the movement distance of the center of gravity of said moving body.

2. A shock absorbing device according to claim 1, wherein said drive means includes means for starting said counterweight means and said moving body substantially simultaneously and stopping said counterweight means and said moving body substantially simultaneously.

3. A shock absorbing device according to claim 1, wherein said drive means includes a first drive source for driving said moving body and a second drive source for driving said counterweight means.

4. A shock absorbing device according to claim 1, wherein said drive means includes means provided between said moving body and said counterweight means to reverse the direction of movement of said moving body and decrease the velocity of movement thereof and transmit it to said counterweight means.

5. A shock absorbing device according to claim 1, wherein said drive means includes means provided between said moving body and said counterweight means to reverse the direction of movement of said counterweight means and increase the velocity of movement thereof and transmit it to said moving body.

6. A shock absorbing device according to claim 1, further including signal producing means acted on by said counterweight means for producing a signal upon said moving body being moved to a predetermined position within said predetermined distance.

7. A camera having a reflecting mirror within a box member through the interior of which a picture-taking light beam can pass, said reflecting mirror having one end thereof supported for pivotal movement between a position across the path of the picture-taking light beam and a position retracted from said path of the light beam, said camera comprising:
(a) a light-intercepting member disposed along the other end opposite to said one end of said mirror lying at a position across said path of the light beam to intercept the light beam passing between said other end of said mirror and said box member;
(b) means for supporting said light-intercepting member pivotably about an axis substantially parallel to the pivot axis of said mirror lying at a position between the position within said box member whereat said light-intercepting member is disposed and the position whereat said one end of said mirror is supported; and
(c) coupling means for coupling said mirror and said light-intercepting member at a position between said one end of said mirror and the pivot axis of said light-intercepting member and pivoting said light-intercepting member in response to the pivotal movement of said mirror to said position retracted from said path of the light beam.

8. A camera according to claim 7, wherein said coupling means includes a slot cam and a pin coupled to each other and provided between said mirror and said light-intercepting member.

9. A camera according to claim 7, wherein said coupling means moves said light-intercepting member so that the center of gravity of said light-intercepting member moves in a direction substantially opposite to the movement of the center of gravity of said pivotally moving mirror.

10. A camera according to claim 9, wherein said light-intercepting member has an inertial mass greater than the inertial mass of said mirror.

11. In a camera having a main movable body provided with an optical element and a driving device provided with a driving source for moving said main movable body over a predetermined distance in a predetermined direction in association with a photographing operation, the improvement comprising:
another movable body;
driving means having another driving source for moving said other movable body;
means for associating said driving device and said driving means to synchronize the movement of said other movable body with the movement of said main movable body; and
signal generating means actuated by said other movable body for generating a signal upon said main movable body being moved to a predetermined position within said predetermined distance.

12. A camera according to claim 11, wherein said associating means includes means for actuating and stopping said other movable body at substantially the same time as the main movable body.

13. A camera according to claim 11, wherein said driving means moves said other movable body in a direction opposite to the movement of said main movable body.

14. A camera according to claim 13, wherein said other movable body has a larger mass than said main movable body, and said driving means moves said other movable body a smaller distance than a distance through which the center of gravity of said main movable body moves.

15. A camera according to claim 11, wherein said signal generating means includes electric switch means having a movable terminal which is displaced by said other movable body.

16. A focal plane shutter device for a camera for controlling the passage of a light beam through an aperture for film exposure, comprising:
a base plate formed with said aperture;
a first light shielding member movably supported on the base plate for closing said aperture before effecting film exposure, the first light shielding member being movable toward one outer side of said aperture to initiate film exposure;
a second light shielding member movably supported on said base plate and disposed at another outer side of said aperture before effecting film exposure, the second light shielding member being movable to close said aperture to complete film exposure;
a first buffering member disposed on the base plate at said one outer side of said aperture and movable in a first direction opposite to the moving direction of the first light shielding member during the movement of said first light shielding member; and
a second buffering member disposed on the base plate at said other outer side of said aperture and movable in a second direction opposite to the moving direction of the second light shielding member during the movement of said second light shielding member.

17. A focal plane shutter device according to claim 16, further comprising a first driving means for driving said first light shielding member, and a second driving means for driving the second light shielding member, and wherein said first buffering member is connected to said first light shielding member and is associated with the first light shielding member by said first driving means, and said second buffering member is connected with said second light shielding member and is associated with said second driving means.

18. A focal plane shutter device according to claim 16, further comprising a main driving means capable of driving said first and second light shielding members independently from each other, an auxiliary driving means capable of driving said first and second buffering members independently from each other, and means for associating said auxiliary driving means with said main driving means.

* * * * *